US010970653B1

(12) United States Patent
Poddar et al.

(10) Patent No.: US 10,970,653 B1
(45) Date of Patent: Apr. 6, 2021

(54) CACHING AND UPDATING DATA RECORDS BASED ON RELATIONSHIPS BETWEEN THE DATA RECORDS

(71) Applicant: priceline.com LLC, Norwalk, CT (US)

(72) Inventors: Amit Poddar, Stamford, CT (US); Michael Diliberto, New Canaan, CT (US); John Caine, Bridgeport, CT (US); Jim Chen, Danbury, CT (US); Will Homes, Norwalk, CT (US); Nasreen Ali, Norwalk, CT (US); Murali Gadde, Norwalk, CT (US); Ian Merritt, Norwalk, CT (US); Ronald Henderson, Norwalk, CT (US); Christine Wong, Norwalk, CT (US)

(73) Assignee: PRICELINE.COM LLC, Norwalk, CT (US)

( * ) Notice: Subject to any disclaimer, the term of this patent is extended or adjusted under 35 U.S.C. 154(b) by 1346 days.

(21) Appl. No.: 15/002,304

(22) Filed: Jan. 20, 2016

Related U.S. Application Data

(60) Provisional application No. 62/199,885, filed on Jul. 31, 2015.

(51) Int. Cl.
*G06Q 10/02* (2012.01)
*G06F 16/951* (2019.01)
*G06F 16/23* (2019.01)

(52) U.S. Cl.
CPC ......... *G06Q 10/02* (2013.01); *G06F 16/2365* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 2008/0052192 A1* | 2/2008 | Fisher | ........... | G06Q 20/32 705/5 |
| 2008/0167886 A1* | 7/2008 | Marcken | ........... | G06Q 10/02 705/5 |
| 2008/0167906 A1* | 7/2008 | De Marcken | ........... | G06Q 10/02 705/5 |
| 2008/0167908 A1* | 7/2008 | Marcken | ........... | G06Q 10/02 705/5 |
| 2008/0167973 A1* | 7/2008 | De Marcken | ........... | G06F 17/30902 705/5 |
| 2008/0262878 A1* | 10/2008 | Webby | ........... | G06Q 10/02 705/5 |
| 2009/0055468 A1* | 2/2009 | Burckart | ........... | G06F 16/00 709/203 |
| 2012/0330693 A1* | 12/2012 | Ciabrini | ........... | G06Q 50/14 705/5 |

(Continued)

*Primary Examiner* — Tonya Joseph
(74) *Attorney, Agent, or Firm* — Elliot H. Karlin; Hickman Becker Bingham Ledesma LLP

(57) ABSTRACT

A system and method for actively updating a data cache is provided. In an embodiment, a plurality of travel listings is received from a plurality of data sources and stored in a data cache. Invalidity prediction instructions are used to determine that a travel listing in the data cache contains inaccurate information. Listing relationship instructions are used to identify listings that are related to the travel listing that contains inaccurate information. Data update requests are then sent to the plurality of data sources for the related listings.

24 Claims, 7 Drawing Sheets

(56) References Cited

U.S. PATENT DOCUMENTS

2014/0199914 A1\* 7/2014 Collinson .............. A01K 51/00
 449/2
2016/0171008 A1\* 6/2016 Ciabrini ............ G06F 16/24552
 707/609

\* cited by examiner

US 10,970,653 B1

CACHING AND UPDATING DATA RECORDS BASED ON RELATIONSHIPS BETWEEN THE DATA RECORDS

RELATED APPLICATION DATA AND CLAIM OF PRIORITY

This application claims the benefit of U.S. Provisional Application No. 62/199,885 entitled "Caching and Updating Data Records Based on Relationships Between the Data Records", filed Jul. 31, 2015, the contents of which are incorporated by reference for all purposes as if fully set forth herein.

FIELD OF THE DISCLOSURE

The present disclosure relates to computers that are configured to retrieve data from a plurality of data sources, store the data in a data cache of the computers, identify invalid data within the data cache, identify data related to the invalid data within the data cache, and request updates from the plurality of data sources for the related data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The modern prevalence of travel booking websites has created a large amount of information that is available to consumers. In the context of travel items, such as hotel rooms, airplane flights, and vacation packages, service providers who own or operate travel websites may negotiate directly with the travel service provider to create an offering for the public. For example, one company may negotiate a price of $100 a night for a room while a second company may negotiate a price of $120 a night for the same room. The travel websites may display the negotiated prices, payment options, and other information about the listings on their individual websites.

The large amount of information available to customers may be overwhelming. With multiple websites available, each of which displaying booking information for multiple listings or inventory items, it is difficult for an end user to compare listings. The difficulty for the end user to reasonably compare listings negotiated by various travel websites has led to the creation of websites that consolidate listings from multiple data sources. The consolidated websites may receive information from each data source regarding availability of listings, number of listings, and rates for each listing. The consolidated websites may then display the various listings on a single site, allowing a user to compare information received from multiple data sources.

One issue with displaying comparative information is that data sources often update listings based on changes in availability, listing sales, or general price fluctuations. If data changes at a data source, the consolidated website must reflect the changes in the listings displayed to the consumer. Otherwise, if prices and availabilities vary between the consolidated website and the data source, the consumer will be unable to trust that the consolidated website contains accurate information.

A consolidated website may attempt to solve this issue by requesting listings from each data source whenever the consolidated website receives a request for listings. Requesting new data for each consumer search may ensure the accuracy of the data, but the repeated requests are inefficient. Additionally, sending constant requests to different data sources puts a high strain on the requesting computer as well as the data sources. If a data source is unable to handle the strain of so many requests, the data source computers may begin to fail.

To decrease the number of requests sent to the data sources, a consolidated website may request all of the listings from the data source at one time and store the listings in a data cache. When the consolidated website receives a request for listings, the consolidated website may fulfill the request with the data stored in the data cache. In order to ensure the accuracy of the listings in the data cache, the consolidated website may periodically update the data cache by requesting new listings from the data source.

While caching the listings received from other data sources decreases the strain on the data sources caused by requesting listings for each search, the data caching method has its own problems. One issue with the data caching method is that the consolidated website must use a large amount of memory to store listings that may never be requested. Additionally, maintaining a balance between accuracy and efficiency becomes difficult. If the cache is refreshed too often, the number of requests to the data source may exceed the number of requests the data source can handle, thereby causing the data source computers to fail. If the cache is not refreshed often enough, the accuracy of the data in the cache begins to decrease, thereby increasing the chance that a consumer will receive incorrect data.

Therefore, there is a need for a system that caches only relevant listings and intelligently refreshes the cache in a way that maximizes the accuracy of the cache while minimizing the number of data requests sent to individual data sources.

SUMMARY

The appended claims may serve as a summary of the disclosure.

DETAILED DESCRIPTION

Figure 1:
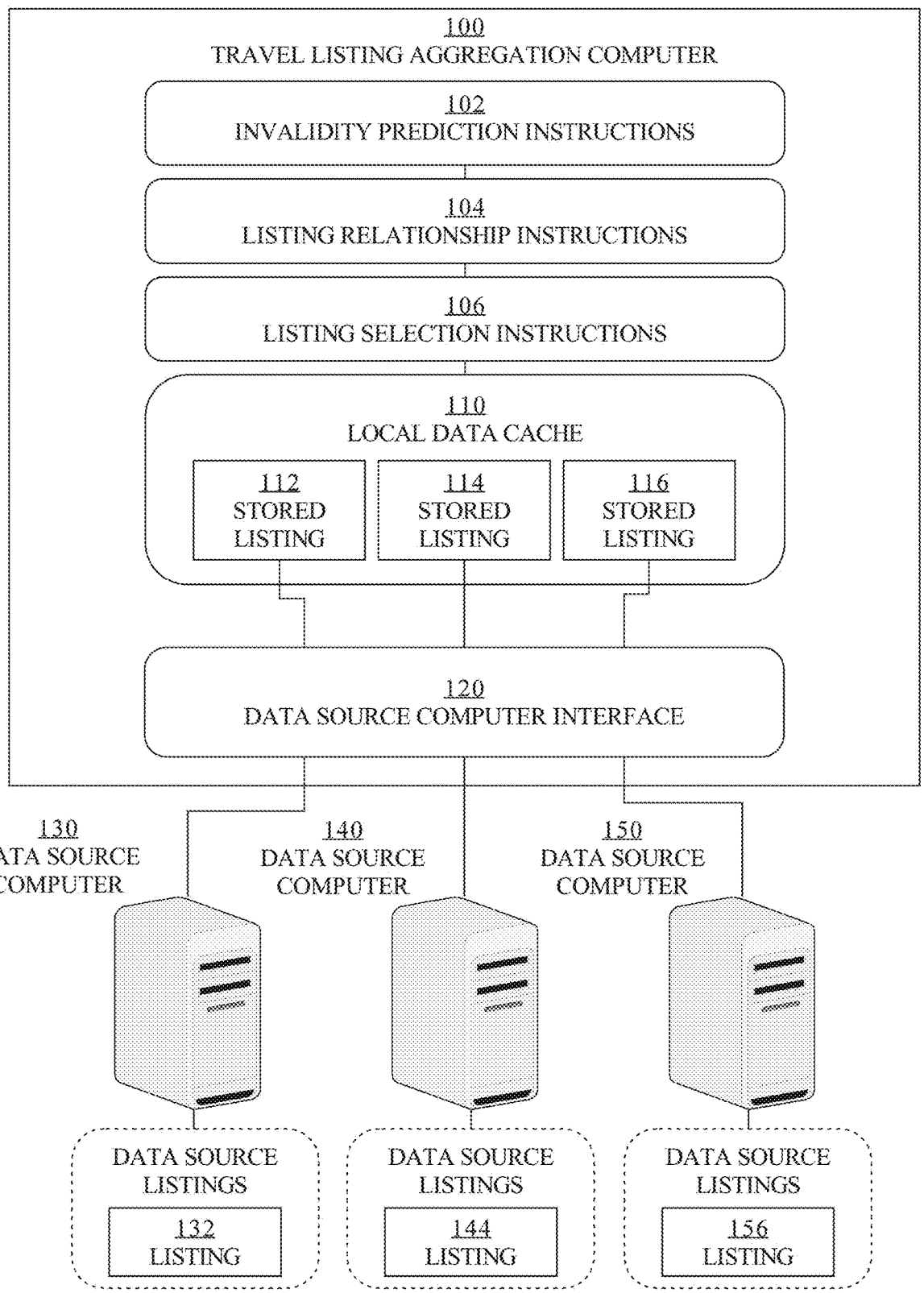
FIG. 1 illustrates an example computer system that is configured or programmed to identify listings in a data cache that may contain invalid data and request updated listings.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

General Overview
Structural Overview
Caching Travel Data
Determining Cached Data Is Invalid
Staleness Threshold
Requesting Updates for Related Listings
Selecting Listings to Refresh
Hardware Overview General Overview Aspects of the disclosure generally relate to computer-implemented techniques for creating and refreshing a data cache. In an embodiment, a travel listing aggregation computer receives a plurality of listings from one or more data source and stores the plurality of listings in a data cache. The travel listing aggregation computer may use digitally programmed logic to identify a listing that contains invalid data. In response to identifying an invalid listing, the travel listing aggregation computer may identify listings that are related to the invalid listing. In response to identifying the related listings, the travel listing aggregation computer may send update requests for the related listings to the one or more data sources. In some embodiments, in response to determining that a number of data requests to a particular data source exceeds a number of data requests that the particular data source can handle, the travel listing aggregation computer may use digitally programmed logic to identify a subset of listings to prioritize over the remaining listings and request updates for only the subset of listings. The travel listing aggregation computer may then wait to request updates for the remaining listings until the particular data source is capable of receiving and processing additional data requests.

In an embodiment, a method comprises: sending, from a travel listing aggregation computer, a first request to one or more data source computers for a plurality of listings that describe a plurality of travel items; wherein each travel listing describes a respective travel item; receiving, at the travel listing aggregation computer, the plurality of listings that describe the plurality of travel items from the one or more data source computers; storing the plurality of listings in a local data cache of the travel listing aggregation computer; using digitally programmed logic of the travel listing aggregation computer, determining that a particular listing of the plurality of listings stored in the local data cache contains invalid data; sending, from the travel listing aggregation computer, a second request to a particular data source computer of the one or more data source computers for updated data for the particular listing; using digitally programmed logic of the travel listing aggregation computer, identifying one or more related listings that are associated with the particular listing; using digitally programmed logic of the travel listing aggregation computer, sending one or more third requests to one or more target data source computers of the one or more data source computers for updated data for the one or more related listings.

In an embodiment, a method comprises sending, from a travel listing aggregation computer, a first request to one or more data source computers for a plurality of listings that describe a plurality of travel items; receiving, at the travel listing aggregation computer, the plurality of listings that describe a plurality of travel items from the one or more data source computers; storing the plurality of listings in a local data cache of the travel listing aggregation computer; using digitally programmed logic of the travel listing aggregation computer, predicting that data in a plurality of stored listings does not match data in a plurality of corresponding listings in the one or more data source computers; using digitally programmed logic of the travel listing aggregation computer, determining, based on one or more data request limits, that the travel listing aggregation computer is unable to send an update request for each listing of the plurality of stored listings; in response to the determining, the travel listing aggregation computer, using digitally programmed logic, selecting one or more particular stored listings of the plurality of stored listings based, at least in part, on one or more selection factors; sending, from the travel listing aggregation computer, a second request to one or more particular data source computers of the one or more data source computers for updated data for the one or more particular stored listings; receiving, at the travel listing aggregation computer, one or more updated listings; replacing the one or more particular stored listings in the local data cache of the travel listing aggregation computer with the one or more updated listings.

Other features and aspects of the disclosure will become apparent in the drawings, description, and the claims.

Structural Overview

FIG. 1 illustrates an example computer system that is configured or programmed to identify listings in a data cache that may contain invalid data and request updated listings.

In an embodiment, travel listing aggregation computer 100 contains invalidity prediction instructions 102, listing relationship instructions 104, listing selection instructions 106, local data cache 110, and data source computer interface 120. "Instructions," as used in FIG. 1, refers to digitally programmed logic in main memory in travel listing aggregation computer 100 which are configured, when executed by one or more processors, to cause the computer to perform the functions that are described herein for that logical element. For example, invalidity prediction instructions when executed cause performing the invalidity prediction functions that are further described herein. These elements of FIG. 1 also indirectly indicate how a typical programmer or software engineer would organize the source code of programs that implement the functions that are described; the code may be organized into logical modules, methods, subroutines, branches, or other units using an architecture corresponding to FIG. 1.

Travel listing aggregation computer 100 may also include other devices, components, or elements of a computer system such as volatile or non-volatile memory, non-volatile storage such as disk, and I/O devices or interfaces.

Data source computers 130, 140, and 150 may each be a server-class computer or multiple computers in a data center. Each of data source computers 130, 140, and 150 may contain one or more listings describing travel items. In an embodiment, a listing is a data record that includes a plurality of data values, such as listing location, availability, and price. Travel listing aggregation computer 100 may be communicatively coupled directly or indirectly via one or more networks, such as local area networks or wide area networks, or internetworks with data source computers 130, 140, and 150.

In an embodiment, invalidity prediction instructions 102, when executed by one or more processors, causes travel listing aggregation computer 100 to determine whether a listing contains invalid data. For example, travel listing aggregation computer 100 may execute invalidity instructions 102 to identify listings in which the listing stored in local data cache 110 differs from the corresponding listing in the data source computer. Invalidity prediction instructions may then be executed to identify one or more related listings and determine that data in the one or more related listings has also likely changed. Invalidity prediction instructions 102 may also be programmed or configured to cause travel listing aggregation computer 100 to create a staleness threshold for one or more listings and to determine whether the staleness threshold has passed. In response to determining that a staleness threshold has passed for a particular listing or determining that a particular listing is related to a listing that contains invalid data, invalidity prediction instructions 102 may determine that the particular listing likely contains invalid data.

In an embodiment, listing relationship instructions 104, when executed by one or more processors, causes travel listing aggregation computer 100 to identify relationships between one or more listings and store the relationship data in memory of travel listing aggregation computer 100. For example, travel listing aggregation computer 100 may execute listing relationship instructions 104 to identify listings that are received from the same data source or listings that described the same property from various data sources. Storing the relationship data may comprise, for each listing, storing a unique listing identifier for the listing and an identifier of each of the related listings. Listing relationship instructions 104 may also be executed to cause travel listing aggregation computer 100 to rate the strength of the relationships and store a strength value with the identifier of the related listing.

In an embodiment, listing selection instructions 106, when executed by one or more processors, causes travel listing aggregation computer 100 to identify limitations on data requests and select one or more listings to be refreshed within the limitations. For example, listing selection instructions 106 may be programmed or configured to cause travel listing aggregation computer 100 to store data indicating, for each data source, a maximum number of requests the data source may be able to handle within a given time period. In response to determining that a number of listings that are identified as likely containing invalid data exceeds the maximum number of requests a particular data source may be able to handle, travel listing aggregation computer 100 may execute listing selection instructions 106 to identify a sub-set of the identified listings and request updates only for the subset of listings.

In an embodiment, local data cache 110 is programmed or configured to store one or more listings when data is received from data source computers 130, 140, and 150. Stored listings 112, 114, and 116 correspond to listings 132, 144, and 156 within data source computers 130, 140, and 150 respectively. For example, data source computer 130 may send listing 132 to travel listing aggregation computer 100 in response to receiving a request for travel listings. Travel listing aggregation computer 100 may store a copy of the listing in local data cache 110 as stored listing 112. In an embodiment, when travel listing aggregation computer 100 receives an updated listing corresponding to listing 132, stored listing 112 is replaced with a copy of the updated listing. Listings may be stored in data structures in memory, rows in a database table, in flat files or spreadsheets, or other forms of stored digital data. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, data source computer interface 120, when executed by one or more processors, causes travel listing aggregation computer 100 to communicate over a network with data source computers 130, 140, and 150. For example, data source computer interface 120 may be programmed or configured to make calls to the application program interfaces (APIs) of web services applications hosted by data source computers 130, 140, and 150. Data source computer interface 120 may be further programmed or configured to send listings received from data source computers 130, 140, and 150 to local data cache 110 with an identifier of a data source computer of origin. For example, data source computer interface 120 may send listing 132 to local data cache 110 along with an identification of data source computer 130.

For purposes of illustrating a clear example, FIG. 1 shows a limited number of instances of certain functional elements. However, in other embodiments, there may be any number of such elements. For example, embodiments may use thousands or millions of different data source computers. Further, data source computes 130, 140, and 150 may be implemented using two or more processors, cores, clusters, or instances of physical machines or virtual machines, configured in a discrete location or co-located with other elements in a datacenter, shared computing facility or cloud computing facility.

In an embodiment, the implementations of the functions described herein for invalidity prediction instructions 102, listing relationship instructions 104, listing selection instructions 106, local data cache 110, and data source computer interface 120 using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve as algorithms, plans or directions that may be used to program a computer or logic to implement the functions that are described.

Caching Travel Data

Figure 2:
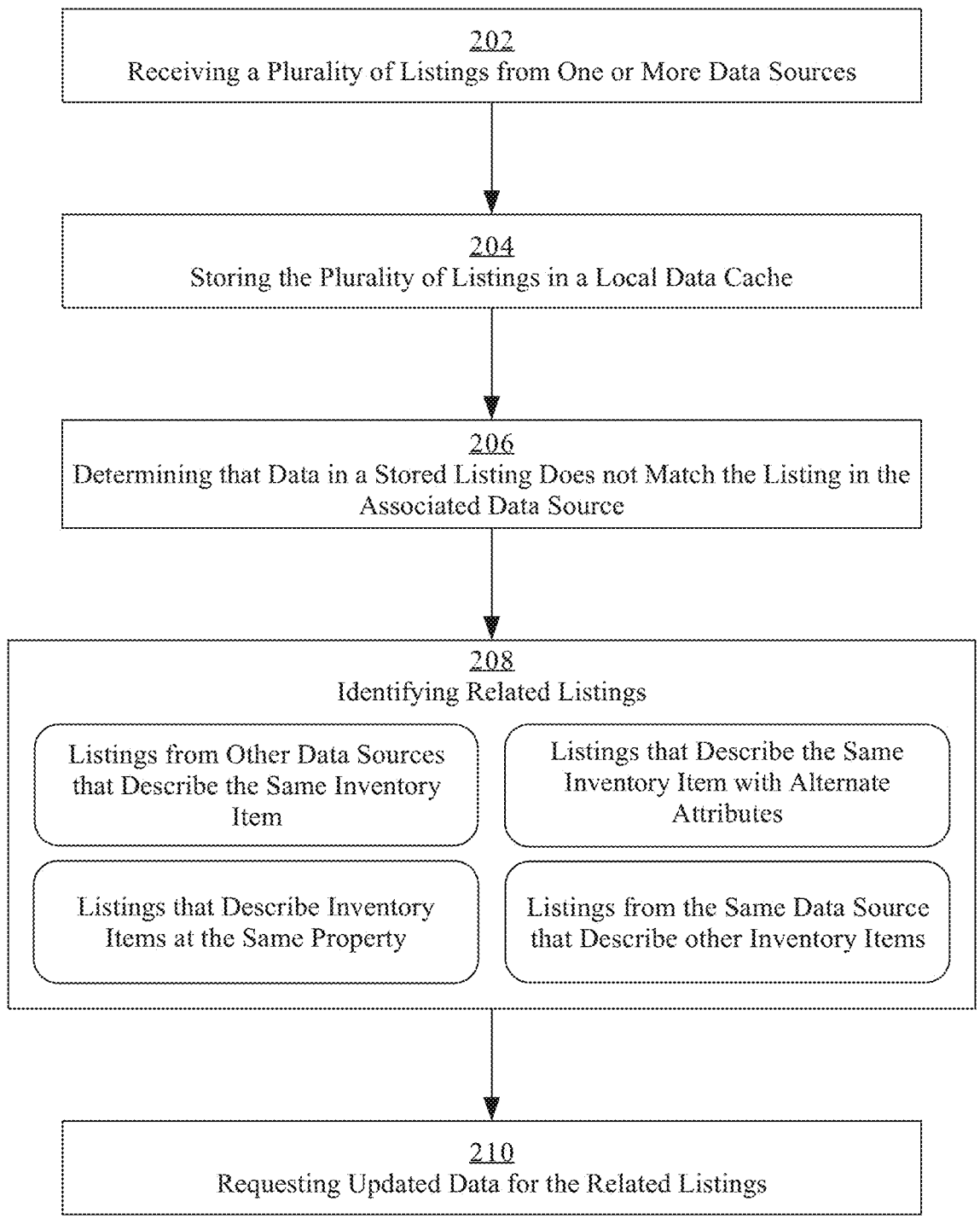
FIG. 2 depicts a method or programming algorithm for identifying one or more listings in a data cache that may contain invalid data and related listings in the data cache that may also contain invalid data.

FIG. 2 depicts a method or programming algorithm for identifying one or more listings in a data cache that may contain invalid data and related listings in the data cache that may also contain invalid data. FIG. 2, and each other method diagram or flow diagram in this disclosure, is intended to describe an algorithm, process or other outline for how the functions shown in the drawing figure may be implemented in programming instructions for a computer. Any suitable programming language or development environment may be used such as JAVA, OBJECTIVE-C, C++, scripting languages, and the like. In practice, an implementation or embodiment will include program instructions for many steps other than those shown in the drawing figures, but FIG. 2, and each other method diagram or flow diagram in this disclosure, nevertheless indicate the algorithmic information that the inventors have deemed sufficient to communicate to a skilled programmer or software engineer how to implement the specified functions in complete working code.

At step 202, a plurality of listings are received from one or more data sources. For example, data source computer interface 120 may make calls to the APIs of web services applications hosted by data source computers 130, 140, and 150. As another example, data source computer interface 120 may receive a plurality of listings from a single data source computer, such as data source computer 130. A copy of each received listing may be stored in local data cache 110 along with an identification of a data source computer of origin. For example, travel listing aggregation computer 100 may assign unique identifiers to each data source computer. Thus, stored listing 112 may be stored with the unique identifier assigned to data source computer 130.

In an embodiment, travel listing aggregation computer 100 requests the plurality of listings from the plurality of data sources in response to receiving a request for one or more listings from a client computing device. In an embodiment, the client computing device is any of a laptop, netbook, personal computer, workstation, smartphone, tablet, PDA, or other computing devices associated with a customer of travel listing aggregation computer 100. Travel listing aggregation computer 100 may provide a graphical user interface in the form of static or dynamic HTML pages that are delivered to and rendered by a browser on the client computing device. Additionally and/or alternatively, the client computing device may host a locally installed client application that interacts with a presentation layer of a server application system hosted at travel listing aggregation computer 100.

The client computing device may send a request to travel listing aggregation computer 100 for one or more listings with specific parameters. For example, the client computing device may request listings that describe hotels in Phoenix, Ariz. with two beds that cost under $130/night and available between Jul. 3, 2015 and Jul. 5, 2015. In response to receiving the request from the client computing device, travel listing aggregation computer 100 may send requests to the plurality of data source computers for listings that include the specific parameters. Travel listing aggregation computer 100 may then cause display of the listings on the client computing device.

At step 204, the plurality of listings are stored in a local data cache. For example, when travel listing aggregation computer 100 receives a plurality of listings with specific parameters to fulfill a request from the client computing device, travel listing aggregation computer 100 may save a copy of each of the listings in local data cache 110. When travel listing aggregation computer 100 receives a second request for travel listings with the specific parameters from a second client computing device, travel listing aggregation computer 100 may retrieve the copies of the listings from local data cache 110 instead of sending requests to the data source computers. Additionally and/or alternatively, travel listing aggregation computer 100 may be programmed or configured to initially search local data cache 110 for listings that meet criteria of each request before sending requests to the data source computers. For example, if in the above example a second request for a hotel room includes a parameter that the room cost under $150/night, travel listing aggregation computer 100 may retrieve the listings for rooms that cost under $130/night from local data cache 110 and send requests to the data source computers for listings that cost between $130/night and $150/night.

By storing copies of requested listings in the local data cache, travel listing aggregation computer 100 minimizes the load on travel listing aggregation computer 100 and on data source computers 130, 140, and 150 caused by sending repeated requests for the same listing to the data source computers. Additionally, travel listing aggregation computer 100 minimizes the number of requested listings at each data source by requesting listings in response to a request from a customer. Thus, travel listing aggregation computer 100 may minimize the processing power necessary to request every listing from each data source and the memory required to store listings in local data cache 110 that are not requested by a customer. Additionally, travel listing aggregation computer 100 saves processing power and memory by minimizing the number of listings that require updates. For example, a first data source may contain listings for Phoenix, Ariz., San Diego, Calif., and Jersey City, N.J. If travel listing aggregation computer 100 only receives requests for listings in Phoenix and San Diego, travel listing aggregation computer 100 may not receive or store the listings for Jersey City. If travel listing aggregation computer 100, using techniques described below, determines that the listings from the first data source computer require updates, travel listing aggregation computer 100 may request updates for the listings in Phoenix and California, but not for the listings in Jersey City.

Determining Cached Data is Invalid

At step 206, a determination is made that the data in the stored listing does not match data in the listing in the associated data source. For example, invalidity prediction instructions 102 may be executed to determine that data at the associated data source has changed or has likely changed. As local data cache 110 contains stored copies of listings, any changes made by the data source computers may not be immediately reflected in the data in the stored listings. Additionally, the data source computers may not indicate to travel listing aggregation computer 100 that data has changed. In an embodiment, travel listing aggregation computer 100 receives data identifying a particular listing that contains incorrect data, such as a listing that is no longer available. Additionally and/or alternatively, travel listing aggregation computer 100 may execute digitally programmed logic in invalidity prediction instructions 102 to identify stored listings that may contain incorrect data. After invalidity prediction instructions 102 are used to identify a particular listing that may contain incorrect data, data source computer interface 120 may send a request for an updated listing to a data source associated with the particular listing. Travel listing aggregation computer 100 may then determine that data in the stored listing does not match data in the listing in the associated data source by comparing data in the updated listing with data in the stored listing.

Figure 3:
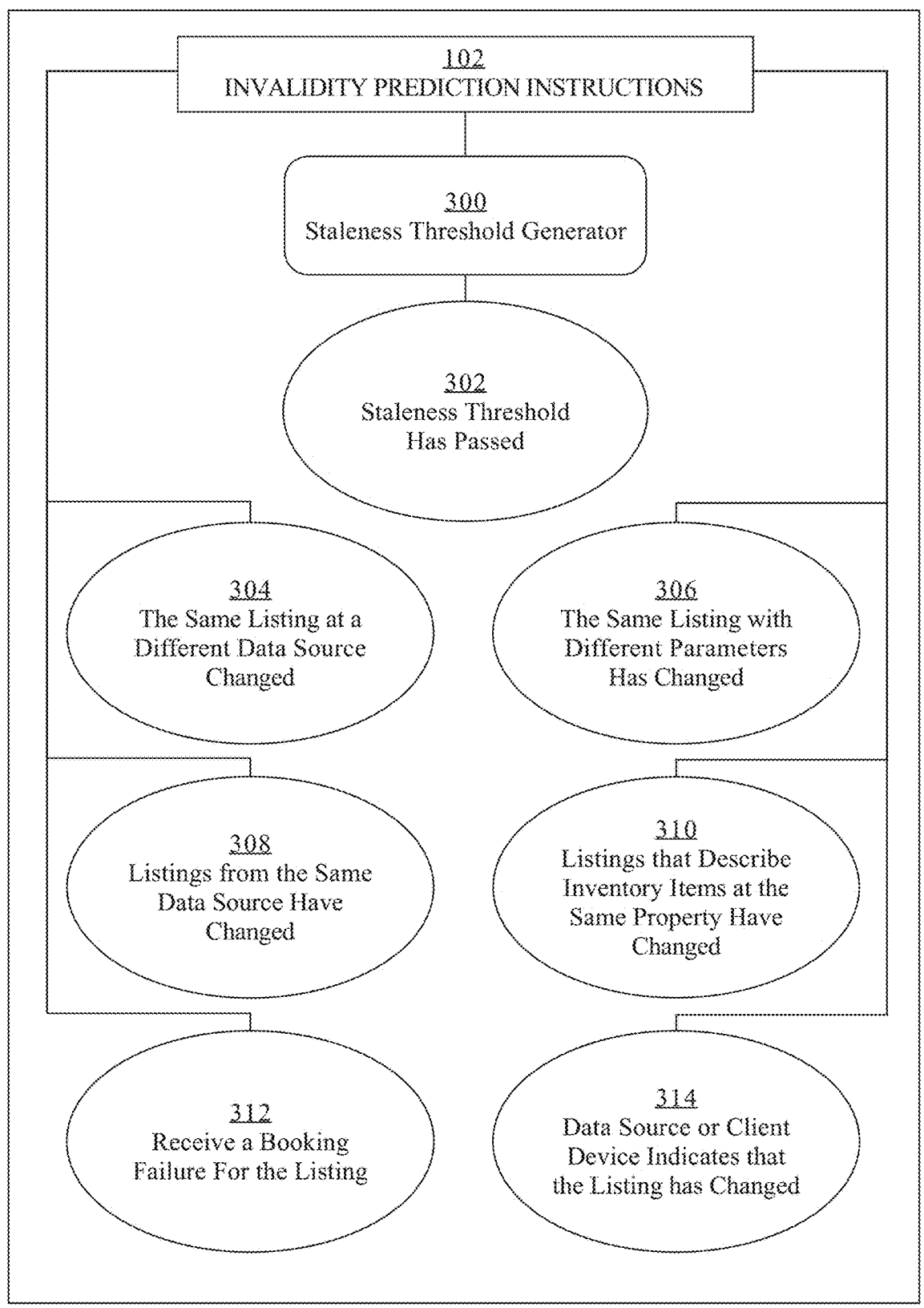
FIG. 3 illustrates an example of invalidity prediction instructions of a travel listing aggregation computer.

FIG. 3 illustrates an example of invalidity prediction instructions 102 of a travel listing aggregation computer. In an embodiment, invalidity prediction instructions 102 contain staleness threshold generator 300 and one or more digitally programmed methods for identifying listings which may contain incorrect data. In an embodiment, staleness threshold generator creates, for one or more listings, a staleness threshold which describes a period of time after which a listing may be considered to contain stale data. Method 302 for determining that a listing may contain invalid data is a determination that a staleness threshold has passed. For example staleness threshold generator 300 may create a staleness threshold of twenty four hours for a particular listing. Travel listing aggregation computer 100 may set a start time for the particular listing when the listing is received, when the listing is updated, or when a data source computer indicates that data has not changed in the particular listing. When travel listing aggregation computer 100 determines that twenty four hours have passed since the start time, invalidity prediction instructions 102 may be executed to determine that the particular stored listing may contain incorrect data.

Method 304 for determining that a listing may contain incorrect data is a determination that the same listing at a different data source has changed. Listing relationship instructions 104 may be used to identify listings from different data sources that describe the same inventory item. For example, a first listing from a first data source may describe a one king bed hotel room at a specific hotel for $120 a night. A second listing from a second data source may also describe a one king bed hotel room at a specific hotel for $120. Based on the matching data between listings, travel listing aggregation computer 100 may determine that the two listings describe the same inventory item. If travel listing aggregation computer 100 receives an indication that the first listing from the first data source has changed, travel listing aggregation computer 100 may determine, based on invalidity prediction instructions 102, that the second listing from the second data source may have also changed.

Method 306 for determining that a listing may contain incorrect data is a determination that the same listing with different parameters has changed. For example, a first search for a listing between Jul. 1, 2015 and Jul. 3, 2015 may result in a plurality of listings which includes a particular room at a particular hotel for $120 a night. A second search for a listing between Jul. 3, 2015 and Jul. 5, 2015 may result in a plurality of listings which includes the particular room at the particular hotel, priced at $150 a night. In response to receiving an indication that the price for the particular room at the particular hotel has dropped to $100 a night between Jul. 1, 2015 and Jul. 3, 2015, travel listing aggregation computer 100 may determine that the listing describing the particular room at the particular hotel between Jul. 3, 2015 and Jul. 5, 2015 may have also changed. The listings describing the same inventory item with different parameters may be received from one or more data source. For example, a single data source may identify a listing using a unique identifier. If two listings with different parameters, such as check-in and check-out dates, include the same unique identifier, travel listing aggregation computer 100 may determine that the two listings are the same listing with different parameters. Additionally and/or alternatively, listing relationship instructions 104 may cause travel listing aggregation computer 100 to match attributes of a listing at a first data source with attributes of a listing at a second data source to determine that the two listings are the same listing with different parameters.

Method 308 for determining that a listing may contain incorrect data is a determination that listings from the same data source have changed. In an embodiment, when travel listing aggregation computer 100 receives data indicating that a listing has changed, travel listing aggregation computer 100 may execute invalidity prediction instructions 102 to identify all other listings that originated from the particular data source. Invalidity prediction instructions 102 may be used to determine that the other listings from the particular data source likely contain incorrect data. For example, a particular data source may update all travel listings at a single time or in response to a specific event. Thus, if travel listing aggregation computer 100 receives an indication that one of the listings received from the particular data source has changed, it is possible that the particular data source has updated the remainder of the listings. Thus, travel listing aggregation computer 100 may execute invalidity prediction instructions 102 to determine that listings describing various properties may no longer contain correct data because they were received from a data source that has made changes to other listings.

Method 310 for determining that a listing may contain incorrect data is a determination that listings describing inventory items at the same property have changed. Listings identified as describing inventory items at the same property may be received from one or more data sources. For example a first listing received from a first data source may describe a first room and include an address of the hotel. A second listing received from the first data source may describe a second room at the same hotel. A third listing received from a second data source may describe a third room with the same address as the first two listings. Listing relationship instructions 104 may be used to determine that the three listings all describe inventory items at the same property. When travel listing aggregation computer 100 receives data indicating that the first listing has changed, invalidity prediction instructions 102 may be executed to identify the second listing and the third listing and determine that data in the second listing and the third listing may also have changed.

Method 312 for determining that a listing may contain incorrect data is a determination that a booking for the listing has failed. A failure, under method 312, may include the listing no longer being available or data in the listing, such as price data, being different than described in the stored listing. For example, travel listing aggregation computer 100 may receive a request from a client computing device for listings that include specific parameters. Travel listing aggregation computer 100 may retrieve stored listings from local data cache 110 that match the specific parameters and cause display of the listings in a graphical user interface on the client computing device. The listing may contain a link to a data source of origin. Upon receiving a selection of a particular listing, travel listing aggregation computer 100 may cause the client computing device to access the data source directly in order to complete the transaction. For example, a selection of a listing may cause a browser on the client computing device to navigate to a webpage hosted by the data source of origin. Travel listing aggregation computer 100 may track the success or failure of the transaction, such as by embedding data into the link that notifies travel listing aggregation computer 100 if the client computing device is unable to complete the transaction. Additionally, travel listing aggregation computer 100 may receive a notification when the client computing device completes the transaction which includes transaction details. Travel listing aggregation computer 100 may compare the transaction details to the information in the stored listing to determine whether any of the data has changed. In response to receiving data indicating that the transaction could not be completed or that data in the stored listing differs from data in the transaction records, travel listing aggregation computer 100 may determine that the listing may contain incorrect data.

Method 314 for determining that a listing may contain incorrect data is receiving an indication from either the data source or client device indicating that the listing has changed. For example, travel listing aggregation computer 100 may cause display on the client computing device of an interface for sending feedback to travel listing aggregation computer 100. The interface for sending feedback may include options to indicate that the listing is no longer available or that the listing displayed by the data source differs from the listing displayed by travel listing aggregation computer 100. In response to receiving a selection of the feedback options, travel listing aggregation computer 100 may determine that listing may contain incorrect data. As another example, a data source may send updates to travel listing aggregation computer 100 identifying listings that have changed. The updates may be sent periodically or in response to a request from travel listing aggregation computer 100 for updates to specific listings.

Invalidity prediction instructions 102 may comprise any combination of the above described methods to determine that a listing may contain incorrect data. For example, invalidity prediction instructions 102 may comprise a method for first determining that data in a listing from a particular data source has changed. Invalidity prediction instructions 102 may further comprise a method for identifying other listings from the data source and determining if they describe inventory items at the same property as other listings that have changed. Additionally and/or alternatively, invalidity prediction instructions 102 may comprise a method for utilizing multiple prediction methods to strengthen a prediction. For example, the invalidity prediction for the listing described above would be stronger than an invalidity prediction created using only a single method, such as other changes in the data source or changes to other listings at the same property.

Staleness Threshold

Figure 4:
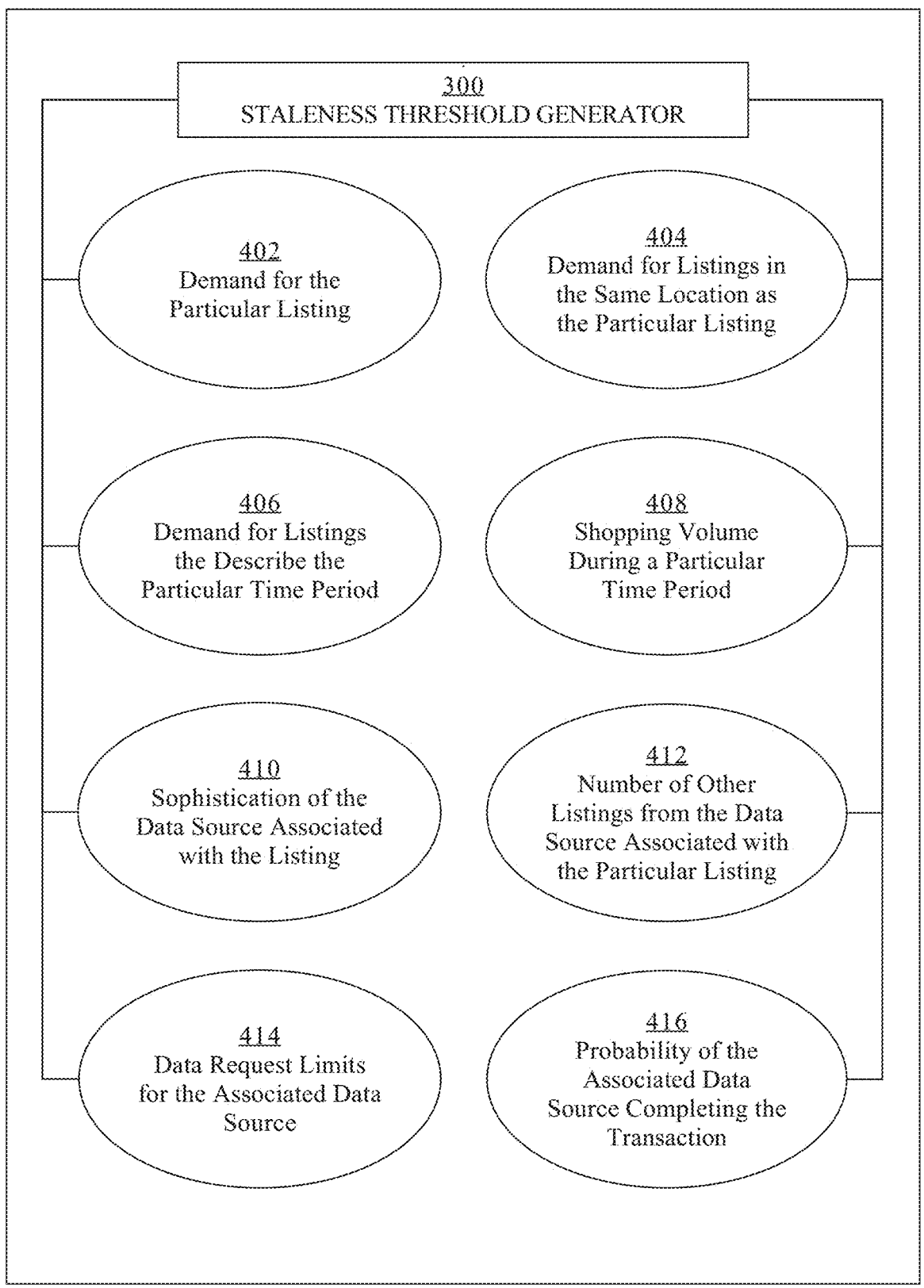
FIG. 4 illustrates an example staleness threshold generator of invalidity prediction instructions of a travel listing aggregation computer.

FIG. 4 illustrates an example staleness threshold generator of invalidity prediction instructions of a travel listing aggregation computer. Staleness threshold generator 300 comprises instructions that are programmed or configured to generate one or more staleness threshold based on one or more factors as seen in FIG. 4 and which may be represented in main memory as stored digital data. In an embodiment, a separate staleness threshold is set for each listing. Additionally and/or alternatively, staleness thresholds may be created for a group of listings. For example a staleness threshold may be set for listings from a particular service provider. As another example, staleness thresholds may be set for all listings that describe availabilities within a specific time frame, such as a within twenty four hours of a current time. In some embodiments, one or more factors may be used to determine a staleness threshold for a particular listing or group of listings.

Factor 402 for generating a staleness threshold is a demand for the particular listing. In an embodiment, staleness threshold generator 300 determines a demand for the particular listing by tracking searches for the listing, selections of the listing, or completed transactions for the listing. For example, staleness threshold generator 300 may increment a demand value for the particular listing each time travel listing aggregation computer 100 receives a search for the listing, a selection of the listing, or an indication from the data source that a transaction was completed for the listing. In an embodiment, the demand value is used to determine the staleness threshold. For example, demand values over a specific maximum demand threshold may be associated with a staleness threshold of one hour, demand values between the specific maximum threshold and a lower threshold may be associated with a staleness threshold of two hours, and so on. As another example, the demand value may be converted into a staleness threshold, such as through a linear equation that multiplies the demand value by a conversion value to create a length of time. In other embodiments, the demand value is factored into the generation of the staleness threshold.

Factor 404 for generating a staleness threshold is a demand for listing in the same locations as the particular listing. In an embodiment, listing relationship instructions 104 are executed to identify relationships between listings based on geographic location. Staleness threshold generator 300 may determine a demand for listings that travel listing aggregation computer 100 identified as belonging to a particular geographic region. For example, staleness threshold generator 300 may increment a regional demand value each time travel listing aggregation computer 100 receives data indicating a search, selection, or transaction completion of a listing associated with the particular geographic region. The regional demand value may be used to generate the staleness threshold or may be considered as a factor for the staleness threshold. For example, if a demand for a particular listing is relatively low, but demands for listings within the same geographic region have recently increased, the high staleness threshold originally set for the particular listing may be decreased to compensate for the increased demand within the geographic region.

Factor 406 for generating a staleness threshold is a demand for listings that describe a particular time period identified in the particular listing. In an embodiment, staleness threshold generator 300 determines a demand for listings within a specific time period. For example, listings for hotel rooms between Jul. 3, 2015 and Jul. 5, 2015 may be in higher demand than listings for hotel rooms between Jul. 10, 2015 and Jul. 12, 2015 and thus are more likely to undergo change. Staleness threshold generator 300 may assign a lower staleness threshold to listings that describe time periods with high demand, such as the Fourth of July weekend based on either a temporal demand value created for listings that describe the particular time period, or past data indicating high demand or frequent changes in listings for the particular time period. Additionally, listings that describe availabilities within a few days from a current date may be more likely to undergo change than listings that describe availabilities several months from the current date. Thus, staleness threshold generator 300 may assign a lower staleness threshold to listings that describe availabilities within a relatively short time period. The demand for a particular time period and the proximity of the particular time period may be used to generate the staleness threshold or may be considered as a factor for the staleness threshold. For example, a staleness threshold may be decreased for a specific property as an amount of time until the time period of the listing decreases.

Factor 408 for generating a staleness threshold is a shopping volume during a particular time period. Staleness threshold generator 300 may determine periods of time during which customer shopping tends to increase. For example, customer shopping may increase during weekends and decrease during the week. Additionally, customer shopping may increase during the mid-to-late afternoon and decrease between the hours of 2:00 am to 5:00 am. In an embodiment, staleness threshold generator 300 uses pasts shopping statistics received from travel listing aggregation computer 100 to determine shopping volumes for different periods of time. For example, travel listing aggregation computer 100 may generate and store shopping logs for each client computing device that requests listings from travel listing aggregation computer 100. The shopping logs may include a time when the client computing device began shopping and a time when the client computing device finished shopping. Travel listing aggregation computer 100 may then identify time periods with high shopping volume based on a number of client computing devices that requested listings during the time periods. In some embodiments, travel listing aggregation computer 100 may identify time periods with high shopping volume based on a number of client computing devices that completed transactions during the time periods. The shopping volume for a particular time period may be used to generate the staleness threshold or may be considered as a factor for the staleness threshold. For example, a staleness threshold for each listing may decrease during periods of high shopping volume and increase during periods of low shopping volume.

Factor 410 for generating a staleness threshold is a sophistication of a data source associated with the listing. For example, an advanced data source may provide change data that indicates which of the listings provided by the advanced data source have changed between data requests from travel listing aggregation computer. Thus, a staleness threshold for the advanced data source may be set to a lower value to increase the accuracy of the stored listings. Listings originating from data sources that are unable to provide change data may be assigned a higher staleness threshold. Additionally, and/or alternatively, staleness threshold generator 300 may identify listings that describe a same inventory item as listings originating from an advanced data source. Staleness threshold generator 300 may assign the identified listings a high staleness threshold as changes to the listing can be identified through changes to the corresponding listing from the advanced data source. The sophistication of a data source may be used to generate the staleness threshold, such as creating a uniformly low staleness threshold for advanced data sources, or may be considered as a factor for the staleness threshold, such as increasing the staleness threshold for listings from a non-advanced data source that correspond to listing from an advanced data source.

Factor 412 for generating a staleness threshold is a number of other listings from the data source with the particular listing. Staleness threshold generator 300 may generate a higher staleness threshold for listings received from data sources that contain a large number of listings in order to not overwhelm the data source with requests. In some embodiments, one or more representative listings from a data source with a large number of listings may be assigned a low staleness threshold, such that executing invalidity prediction instructions 102 causes travel listing aggregation computer 100 to determine that the remaining listings likely have not changed as long as the representative listings have not changed. The number of other listings from the data source may be used to generate the staleness threshold or may be considered as a factor for the staleness threshold.

Factor 414 for generating a staleness threshold is a data request limit for the associated data source. In an embodiment, a data request limit is a maximum number of data requests that may be generated by travel listing aggregation computer 100 during a particular time period. Data request limits may be set by each data source and/or determined by travel listing aggregation computer 100. Data request limits may also change over time. For example, a specific data source may request that travel listing aggregation computer 100 reduce the number of requests for updated data during peak hours of the day. Additionally, and/or alternatively, travel listing aggregation computer 100 may receive an indication from a data source that the data source computer is unable to process a current number of requests. For example, travel listing aggregation computer 100 may determine that the data source computer has begun taking an increased amount of time to respond to update requests. In response to identifying a data request limit for a data source and/or determining that a data request limit for the data source has decreased, staleness threshold generator 300 may increase the staleness thresholds for listings from the data source so that a number of update requests based on the staleness threshold does not exceed the data request limit. Data request limits may be used to generate the staleness threshold or may be considered as a factor for the staleness threshold. For example, a uniformly small staleness threshold may be set for listings received from data sources with extremely large data request limits.

Factor 416 for generating a staleness threshold is a probability of the associated data source completing the transaction. Specific data sources may be more likely to complete transactions than other data sources. For example, a first data source may provide an intuitive graphical user interface with persuasive descriptions of hotel rooms while a second data source may provide an unintuitive graphical user interface and may often crash during a transaction. In this example, a user is more likely to complete a transaction with the first data source than with the second data source. Travel listing aggregation computer 100 may determine the probability of each data source completing a transaction using a metric called look-to-book data. Look-to-book data comprises a comparison of a number of times a listing is selected with a number of times a transaction is completed with a selected listing. For example, travel listing aggregation computer 100 may store data indicating, for each data source, a number of times travel listing aggregation computer 100 received a selection of a listing associated with the data source. Travel listing aggregation computer 100 may also store data indicating, for each data source, a number of times travel listing aggregation computer 100 has received an indication from the data source that a transaction has been completed. The look-to-book data may comprise a ratio of the first value indicating selections of listings to the second value indicating completed transactions. As data sources with a high look-to-book ratio are more likely to remove or change listings due to availability, staleness threshold generator 300 may decrease the staleness threshold for listings received from data sources with a high look-to-book ratio. Look-to-book data may be used to generate the staleness threshold or may be considered as a factor for the staleness threshold. For example, listings from a data source with an extremely high look-to-book ratio may be assigned a uniformly small staleness threshold.

In an embodiment, staleness threshold generator 300 uses a combination of two or more of the above factors to generate the staleness threshold for a listing. For example, a baseline staleness threshold may be set for all listings at four hours. The baseline staleness threshold may be based on average values for the two or more above factors, such as demand value of the listing, look-to-book ratio, and time until the availability. The baseline staleness threshold may then be adjusted based on differences between values for the two or more factors of a particular listing and the average values for the two or more listings. For example, if the demand value for the particular listing is higher than average, then the baseline staleness threshold may be decreased for the particular listing. Additionally, the factors may be weighted such that some factors have a larger affect on the staleness threshold than others. For example, a current shopping volume may be assigned a high weight based on the likelihood of data changing during a period of high shopping volume while demand for listings in the same location as the particular listing may be assigned a lower weight.

In an embodiment, one or more factors, such as the data request limit may be used as a modifier to the staleness threshold for a group of listings. Staleness threshold generator 300 may initially create comparative values for staleness thresholds for each listing in a specific group of listings, such as listings from a particular data source. Staleness threshold generator 300 may then use the modifier factor to create discrete values for each staleness threshold. As an example, a particular data source may have a data request limit of sixty shops per day. Based on one or more factors described above, staleness threshold generator 300 may determine that five of the ten listings received from the particular data source should be updated twice as often as the remaining five listings. Thus, staleness threshold generator 300 may create staleness thresholds for each group of five listings such that the first five listings are updated a maximum of forty times a day and the second five listings are updated a maximum of twenty times a day.

Requesting Updates for Related Listings

Referring again to FIG. 2, at step 208, listings related to the stored listing are identified. For example, travel listing aggregation computer 100 may execute listing relationship instructions 104 to identify and store relationship data with each listing indicating one or more of an identification of listings that describe the same inventory item, an identification of listings that describe the same inventory item with alternate attributes, an identification of listings that describe inventory items at the same property, or an identification of listings received from the same data source that describe other inventory items. Additionally and/or alternatively, each stored listing may include identification data indicating a data source of origin, an identification of the inventory item, stored parameters, and an identification of the property with the listing. Listing relationship instructions 104 may, in response to travel listing aggregation computer 100 receiving data indicating that data in a particular stored listing does not match data in the listing at the associated data source, cause travel listing aggregation computer 100 to retrieve the identification data from the stored listing and search for other listings that contain one or more pieces of matching identification data.

At step 210, updated data is requested for the related listings. For example, data source computer interface 120 may identify corresponding data sources based on information in the stored listing. In response to identifying the corresponding data source for a related listing, data source computer interface 120 may send a request to the data source computer requesting updated data for the stored listing. For example, referring to FIG. 1, stored listing 112 may be identified as related to stored listing 114. If travel listing aggregation computer 100 determines that data in stored listing 112 does not match the data in listing 132, data source computer interface 120 may request an updated listing 144 to replace stored listing 114.

In an embodiment, the cache refreshing method described herein may continually update listings based on identified changes. For example, in response to determining that a stored listing corresponding to a first data source contains incorrect data, travel listing aggregation computer 100 may identify a related listing corresponding to a second data source and request updates to the related listing. If data in the related listing does not match the data in the updated related listing, travel listing aggregation computer 100 may identify the other listings corresponding to the second data source as possibly containing inaccurate information. Travel listing aggregation computer 100 may then send requests to the second data source for updated listings for the other listings corresponding to the second data source. In response to receiving the updated listings, travel listing aggregation computer 100 may determine that one of the other listings contained incorrect data and identify related listings for updating. By requesting updates based on relationships to stored listings that contain incorrect data, travel listing aggregation computer can optimize requests for updates in a manner that maximizes the accuracy of the data in local data cache 110 while minimizing a number of update requests that return listings with no changes.

In an embodiment, travel listing aggregation computer 100 uses relationships to further minimize the number of update requests sent to the data sources. For example, travel listing aggregation computer 100 may request updates for multiple listings from a first data source. If travel listing aggregation computer 100 determines that a stored listing for which an update was requested contained correct data, travel listing aggregation computer 100 may not request updates for a listing describing the same inventory item from a second data source even if the listing is related to other listings which contained incorrect data.

Selecting Listings to Refresh

In some situations, the decreased number of data requests generated using the methods described herein may still exceed data request limits for one or more data sources. For example, travel listing aggregation computer 100 may identify several hundred stored listings corresponding to listings received from a first data source which may contain inaccurate data. If the first data source has a data request limit of one hundred requests, travel listing aggregation computer 100 may not be able to update all of the identified listings. In an embodiment, travel listing aggregation computer 100 executes digitally programmed logic to identify a subset of listings for updating.

Figure 5:
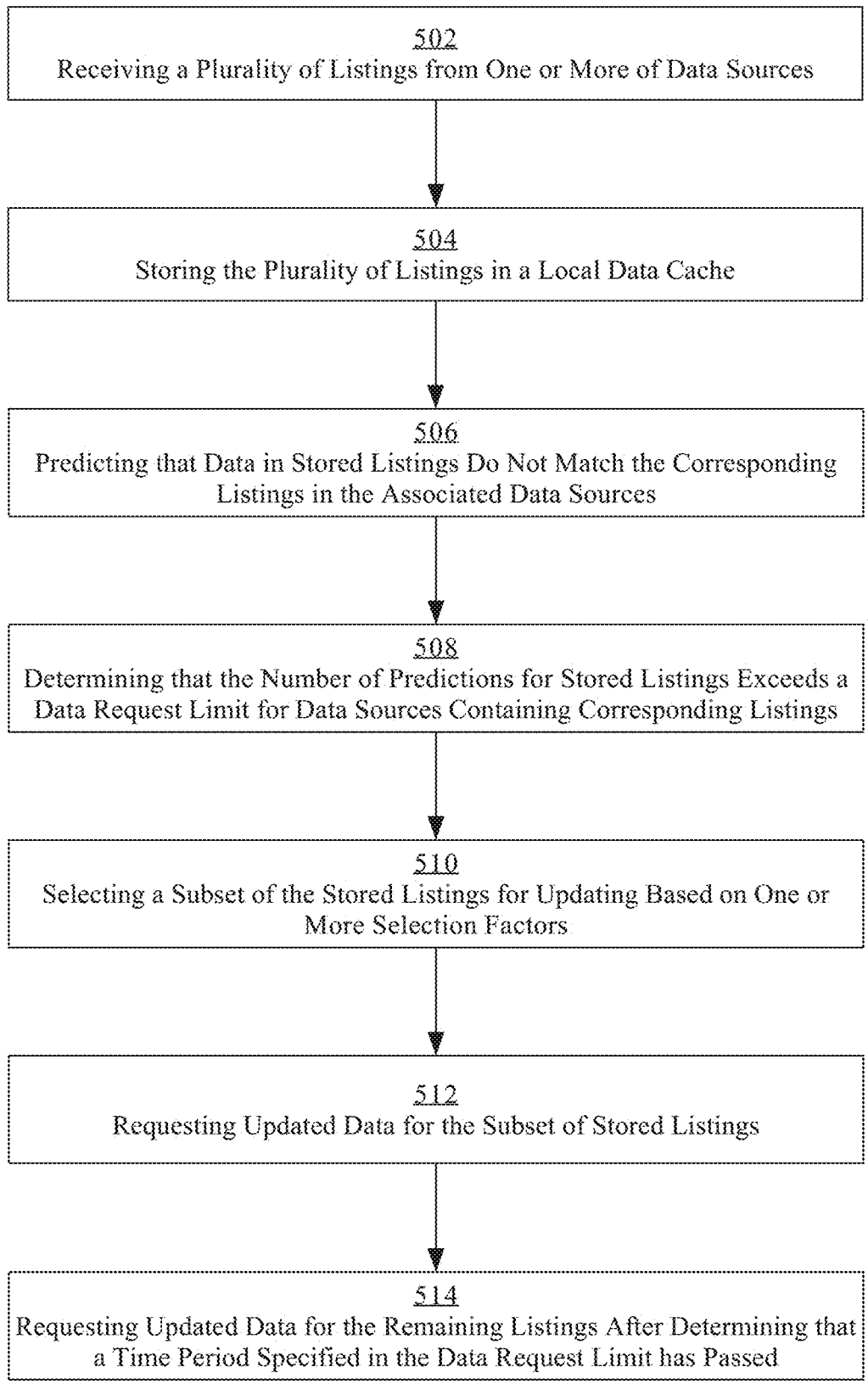
FIG. 5 depicts a method or programming algorithm for identifying a plurality of listings in a data cache that may contain invalid data and selecting a subset of the plurality of listings based on one or more selection factors.

FIG. 5 depicts a method or programming algorithm for identifying a plurality of listings in a data cache that may contain invalid data and selecting a subset of the plurality of listings based on one or more selection factors. At step 502, a plurality of listings is received from one or more data sources. For example, travel listing aggregation computer 100 may request a catalogue of listings from the one or more data sources. Additionally and/or alternatively, travel listing aggregation computer 100 may request the plurality of listings in response to a request from a client computing device. At step 504, the plurality of listings is stored in the local data cache. At step 506, a prediction is generated that data in one or more stored listings does not match data in the corresponding listing in the associated data source. The prediction may be based on a failure to book, a current time exceeding a staleness threshold, or a relation of the one or more stored listings to other listings which contained incorrect data.

At step 508, a determination is made that the number of predictions for the stored listings exceeds a data request limit for data sources containing corresponding listings. As discussed above, data request limits may be generated by the data source and/or by travel listing aggregation computer 100. Data request limits may also change for each data source depending on the capabilities of the data source at a given time. For example, a data source may request a lower data request limit during periods of high shopping frequency. Travel listing aggregation computer 100 may also be programmed or configured to lower the data request limit for some data sources during periods of high shopping frequency and raise the data request limit for the data sources during periods of low shopping frequency.

Figure 6:
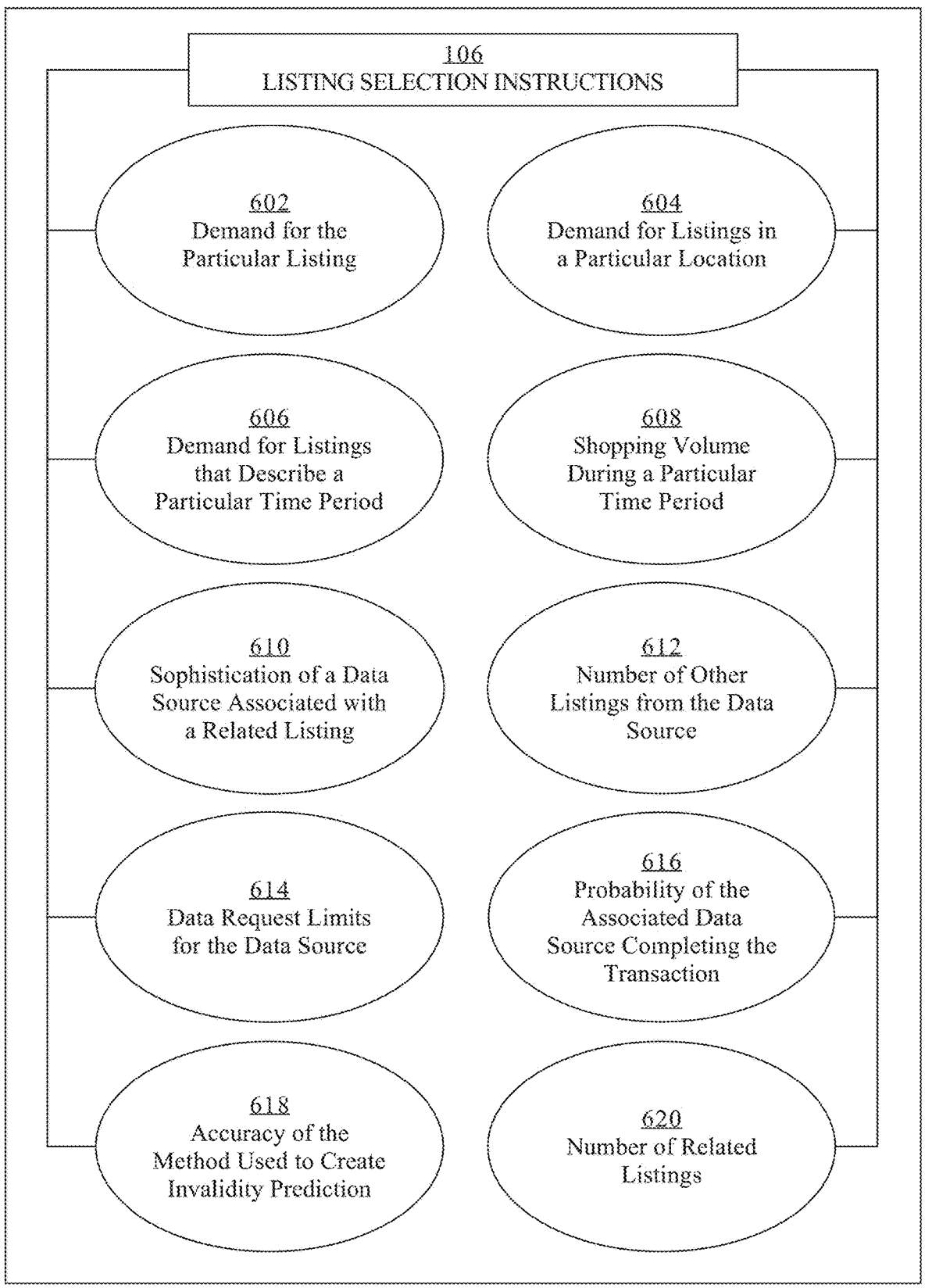
FIG. 6 illustrates an example of listing selection instructions of a travel listing aggregation computer.

At step 510, a subset of the stored listings is selected for updating based on one or more selection factors. FIG. 6 illustrates an example of listing selection instructions of a travel listing aggregation computer. In an embodiment, listing selection instructions, when executed by one or more processors, cause travel listing aggregation computer 100 to select a subset of listings for updating based on one or more selection factors as further described herein, and which may be represented as digitally stored values in main memory.

Factor 602 for selecting a subset of the stored listings is a demand for the particular listing. Demand for a particular listing may be determined using any of the methods described above. For example, a number of selections of the particular listing and/or a number of searches for the particular listing may be used to determine a demand for the particular listing. Listing selection instructions 106 may be executed to identify, within the predicted listings, one or more listings that are in high demand. In order to minimize a number of booking failures, listing selection instructions 106 may prioritize listings that are in high demand for updating over listings which are rarely selected.

Factor 604 for selecting a subset of the stored listings is a demand for listings in the same location as the particular listing. A geographic location for listings may be determined using information within the listing, such as a physical address of the hotel or a city of the hotel. Travel listing aggregation computer 100 may execute listing selection instructions 106 to determine a relative demand for listings in each location. For example, if listings in Jersey City, N.J. receive an average of a few hundred selections per month and listings in San Diego, Calif. receive an average of over nine thousand listings per month, travel listing aggregation computer 100 may determine that the demand for listings in San Diego is relatively high and the demand for listings in Jersey City is relatively low. In response to determining that a demand for listings in a particular region is higher than a demand for listings in other regions, listing selection instructions 106 may prioritize the listings in the particular region for updating. Additionally, factor 604 may be combined with other factors to create various priority levels. For example, travel listing aggregation computer 100 may determine that Las Vegas, Nev. has a relatively high demand and, in response, may prioritize listings in Las Vegas over listings in other cities. travel listing aggregation computer 100 may also determine that listings for two specific hotels in Las Vegas have a higher demand than other listings in Las Vegas and, in response, travel listing selection instructions 106 may prioritize the listings for the two specific hotels over the other listings in Las Vegas which are prioritized over listings in other cities.

Factor 606 for selecting a subset of the stored listings is a demand for listings that describe a particular time period. Listing selection instructions 106 prioritize listings in time periods with relatively high demands. Additionally, listing selection instructions 106 may cause travel listing aggregation computer 100 to create multiple categories of time periods with relatively high demand. For example, listings in July and August may have higher demands than listings in May and June. Additionally, within July and August listings over a weekend may have a higher demand than listings during the week. Listing selection instructions 106 may prioritize listings in July and August over listings in May and June and listings over a weekend in July and August over the other listings in July and August. Additionally and/or alternatively, demand for exact time periods of the listings may be compared to demands for exact time periods of other listings. For example, a demand for listings describing availabilities for a two night stay from Jul. 3, 2015 to Jul. 5, 2015 may be compared to a demand for listings describing a one week stay from Jul. 3, 2015 to Jul. 10, 2015. The listings with the higher demand may be prioritized over listings with lower demand. Additionally, factor 606 may be combined with other factors to determine priorities for specific listings. For example, while listings in Las Vegas may have a relatively high demand, the demand for listings in Las Vegas may decrease during the Summer when temperatures increase. In an embodiment, a single factor is created from the combination. For example, demand for listings in Las Vegas during the Summer may be compared to a demand for listings in Las Vegas during the Winter, a demand for listings in San Diego during the Summer, and a demand for listings in San Diego during the Winter.

Factor 608 for selecting a subset of the stored listings is a shopping volume during a particular time period. Shopping volume may be factored into a selection of the subset of listings in a variety of ways. In an embodiment, a high shopping volume during a particular time period may cause travel listing aggregation computer 100 to select a lower number of listings for updating from a particular data source. For example, a particular data source may be unable to process a large number of data requests. Thus, when a shopping volume increases, travel listing aggregation computer 100 may decrease the number of date requests made to the particular data source in order to prevent a failure of the data source. In an embodiment, listing selection instructions 106 may cause travel listing aggregation computer 100 to select a higher number of listings for updating from a particular data source during a particular time period with a high shopping volume. For example, a particular data source may be capable of handling a large number of data requests. As shopping volume increases, the likelihood that data will change due to completed transactions increases. Additionally, the likelihood that a client computing device will select one of the listings that contains incorrect data increases. travel listing aggregation computer 100 may identify periods of high shopping volume and increase the number of selections of listings for data sources that are capable of handling the large number of requests.

Factor 610 for selecting a subset of the stored listings is a sophistication of a data source associated with a related listing. For example, some data sources may provide update data indicating which items have changed. Travel listing aggregation computer 100 may execute listing selection instructions 106 to identify listings that are closely related to listings originating from the sophisticated data sources. In response to determining that one or more listings are related to a listing at a sophisticated data source, travel listing aggregation computer 100 may request updates from the sophisticated data sources for the related listings. If no data has changed in the sophisticated data sources, listing selection instructions 106 may not cause travel listing aggregation computer 100 to select the identified listings for updating. For example a first listing at a sophisticated data source may describe the same inventory item as a second listing at an unsophisticated data source. If a staleness threshold for the second listing is exceeded, instead of selecting the second listing for updating, travel listing aggregation computer 100 may select the first listing at the sophisticated data source for updating. If data has changed in the first listing, travel listing aggregation computer 100 may select the second listing for updating. If no data has changed in the first listing, listing selection instructions 106 may deprioritize the second listing for updating.

Factor 612 for selecting a subset of the stored listings is a number of other listings from the data source associated. For example, if a data source has a large number of listings, travel aggregation computer 100 may select a relatively small number of listings for updating, given that it is likely other listings may need to be updated based on results of other updates. For example, if a staleness threshold for listings at a first data source with a large number of listings is exceeded, travel listing aggregation computer 100 may select a relatively small number of the stale listings to update because updates to the listings may cause the execution of invalidity prediction instructions 102 to create stronger invalidity predictions for other listings at the first data source. Thus, travel listing aggregation computer 100 may execute listing selection instructions 106 to identify the other listings at the first data source as listings that may potentially contain incorrect data in order to limit the selected number of listings in case more updates need to be made within the data request limit.

Factor 614 for selecting a subset of the stored listings is a data request limit for the associated data source. The data request limit for a particular data source may be used to determine how many of the identified listings receive updates. For example, a data request limit for a particular time period may be thirty data requests while the execution of invalidity prediction instructions 102 may have caused identification of two hundred listings that may contain invalid data. Listing selection instructions 106 may prioritize the listings based on the factors described herein and select the thirty listings with the top priorities from the two hundred listings that may contain invalid data.

Factor 616 for selecting a subset of the stored listings is a probability of the data source completing the transaction. The probability of a data source completing a transaction may be identified through look-to-book data as described above. The look-to-book data may be specific to a type of listing for each data source. For example, a first data source may have a high look-to-book ratio for long listings, such as listings that span one or more weeks, but may have a low look-to-book ratio for shorter listings, such as listings that span one or two nights. As the look-to-book ratio for the particular data source is higher for long listings, listing selection instructions 106 may prioritize long listings for the particular data source.

Factor 618 for selecting a subset of the stored listings is an accuracy of the method used to create the invalidity prediction. Invalidity prediction instructions 102 may include instructions to rate the accuracy of different predictions methods used to determine that a listing likely contains incorrect data. Rating the accuracy of the different predictions may comprise, for each data update request, identifying a method used to determine that the listing contains incorrect data and determining whether the updated listing differs from the stored listing. For each method, travel listing aggregation computer 100 may store data indicating a percentage of update requests based on the method in which data in the updated listing differed from data in the stored listing. For example, if travel listing aggregation computer 100 sends a request for an updated listing to a particular data source because the staleness threshold for the stored listing has passed, travel listing aggregation computer 100 may store data indicating, for the staleness threshold method, whether the update request was successful, i.e. data in the updated listing differed from data in the stored listing, or whether the update request was unsuccessful, i.e. data in the updated listing matched data in the stored listing. In an embodiment, listing selection instructions 106 may assign a high priority to listings that were identified as possibly containing incorrect data using a method with a high accuracy rating. For example, if a first method has a ninety five percent accuracy rating, listing selection instructions 106 may prioritize listings identified using the first method over listings identified using a second method with a sixty five percent accuracy rating.

Factor 620 for selecting a subset of the stored listings is a number of related listings. Listing selection instructions 106 may prioritize listings that are related to a high number of listings over listings that are related to a low number of listings. Travel listing aggregation computer 100 may execute listing selection instructions 106 to identify representative listings, i.e. listings that are related to other listings such that if data in the representative listing changes it is likely that data in the other listings has changed. For example, a first listing may be identified as a representative listing for fifty other listings while a second listing is only identified as a representative listing for two other listings. If an update request for the first listing results in an updated listing with different data than the first listing, travel listing aggregation computer 100 may determine that the related fifty listings likely contain incorrect data. If an update request for the second listing results in an updated listing with different data than the second listing, travel listing aggregation computer 100 may only determine that the two related listings likely contain incorrect data. Thus, as an update for the first listing may result in more invalidity information than an update for the second listing, listing selection instructions 106 may prioritize the first listing over the second listing. Additionally and/or alternatively, travel listing aggregation computer 100 may identify a number of related listings in order to maximize the likelihood of a prediction. For example, if a first data source has a low data request limit, then, for a stored listing corresponding to a listing at the first data source, travel listing aggregation computer 100 may identify related listings at other data sources and request updates for those listings. If data has not changed at the other data sources for the related listings, then listing selection instructions 106 may deprioritize the stored listing.

Referring again to FIG. 5, at step 512 updated data is requested for the subset of stored listings. In an embodiment, listing selection instructions 106 comprises a combination of one or more of the above factors to prioritize a subset of listings for updating. Listing selection instructions 106 may cause travel listing aggregation computer 100 to select the listings with the top priorities within the data request limit for updating. Data source computer interface 120 may then send data requests for the selected subset of listings to the data source computers. Upon receiving updated listings, travel listing aggregation computer 100 may determine whether data in the subset of stored listings differs from the data in the corresponding updated listings. If data has changed, travel listing aggregation computer 100 may replace the stored listings with the updated listings. Additionally, travel listing aggregation computer 100 may update accuracy ratings for methods of predicting invalidity based on whether data has changed in the updated listings. If data has not changed in a listing, travel listing aggregation computer 100 may identify one or more related listings to the listing that were identified as likely containing inaccurate predictions and update the inaccuracy prediction. For example, if a related listing describes the exact same inventory item, travel listing aggregation computer 100 may remove the prediction that the related listing contains incorrect data in response to determining that data in the updated listing contained no changes from the data in the stored listing.

At step 514, updated data is requested for the remaining listing after a determination that a time period specified in the data request limit has passed. In an embodiment, a data request limit identifies a maximum number of data requests per a specific period of time. For example, a data request limit for a particular data source may be one hundred data requests per hour. If travel listing aggregation computer 100 initially identified one hundred and sixty listings that likely contain incorrect data, a first data request update for the subset of listings containing one hundred listings may be sent to the particular data source during a first hour and a data request for updates to the remaining listings may be sent in a second hour. Additionally, some data request limits may last only during specific periods. For example, during popular shopping times in a day a particular data source may request a limit of one hundred data requests per hour. Travel listing aggregation computer 100 may send update requests within the data request limit during the popular shopping times. When travel listing aggregation computer 100 receives an indication that the popular shopping time has ended or that the data request limit has dropped, travel listing aggregation computer 100 may send update requests for the remaining listings.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
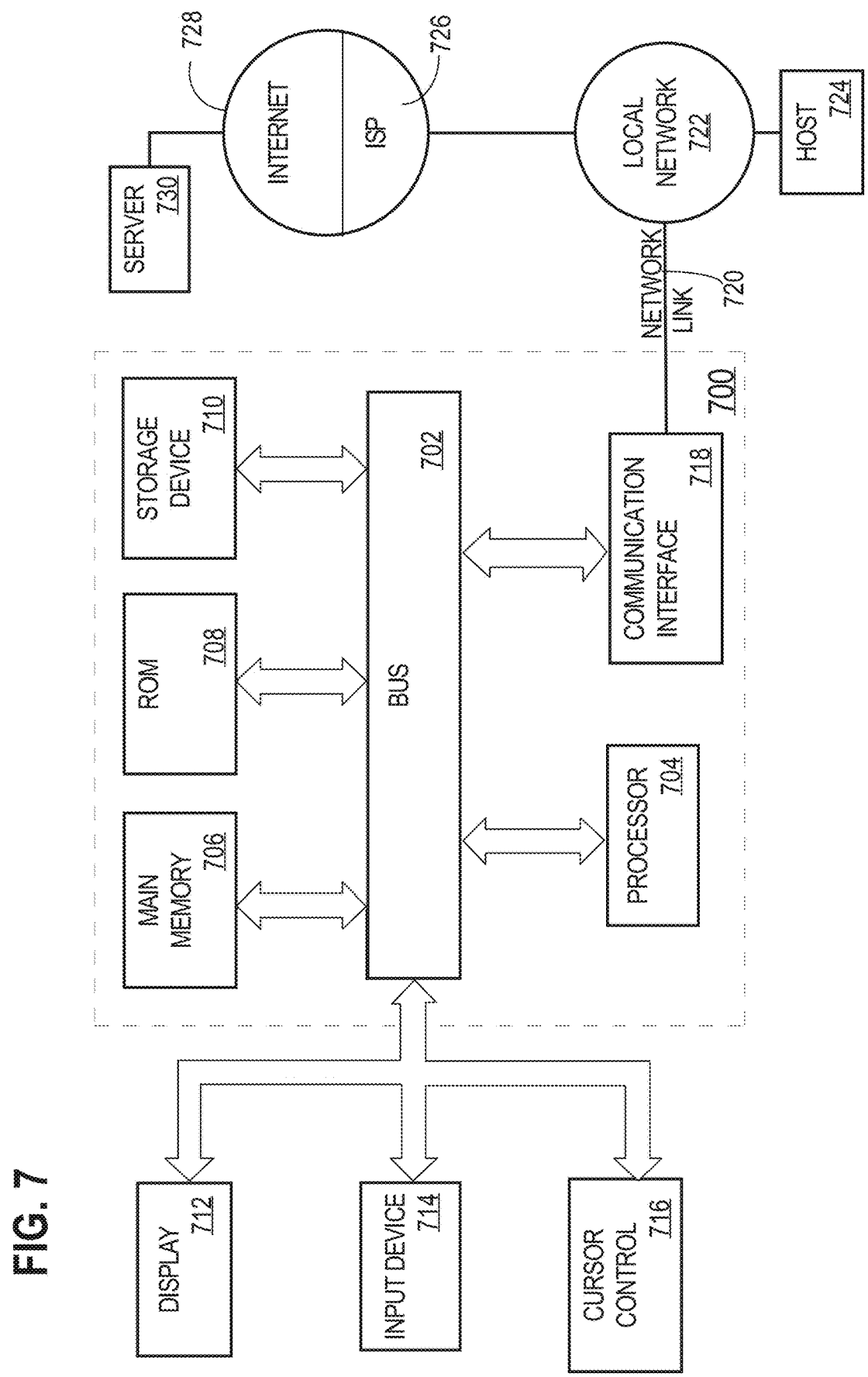
FIG. 7 illustrates a computer system upon which embodiments may be implemented.

For example, FIG. 7 is a block diagram that illustrates a computer system 700 upon which embodiments may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
sending, from a travel listing aggregation computer, a first request to one or more data source computers for a plurality of listings that describe a plurality of travel items;
wherein each travel listing describes a respective travel item;
receiving, at the travel listing aggregation computer, the plurality of listings that describe the plurality of travel items from the one or more data source computers;
storing the plurality of listings in a local data cache of the travel listing aggregation computer;
using digitally programmed logic of the travel listing aggregation computer, determining that a particular listing of the plurality of listings stored in the local data cache contains invalid data;
sending, from the travel listing aggregation computer, a second request to a particular data source computer of the one or more data source computers for updated data for the particular listing;
using digitally programmed logic of the travel listing aggregation computer, identifying one or more related listings that are associated with the particular listing;
using digitally programmed logic of the travel listing aggregation computer, sending one or more third requests to one or more target data source computers of the one or more data source computers for updated data for the one or more related listings.

2. The method of claim 1 wherein determining that the particular listing of the plurality of listings stored in the local data cache contains invalid data comprises:
receiving a request at the travel listing aggregation computer from a user computing device to cause display of a plurality of requested listings;
using digitally programmed logic of the travel listing aggregation computer, causing displaying on the user computing device the plurality of requested listings;
wherein the plurality of listings stored in the local data cache includes the plurality of requested listings;
receiving, at the travel listing aggregation computer from the user computing device, a selection of the particular listing;
using digitally programmed logic of the travel listing aggregation computer, sending a transaction request to the particular data source computer that identifies the particular listing;
receiving, at the travel listing aggregation computer from the particular data source computer, an indication that the particular listing contains invalid data.

3. The method of claim 1 wherein the travel listing aggregation computer determining that the particular listing of the plurality of listings stored in the local data cache contains invalid data comprises:
using digitally programmed logic of the travel listing aggregation computer generating, a staleness threshold for the particular listing that describes a period of time after which the particular listing is considered stale;
using digitally programmed logic of the travel listing aggregation computer, determining that the staleness threshold for the particular listing has passed;
using digitally programmed logic of the travel listing aggregation computer, sending an update request to the particular data source computer that identifies the particular listing;
receiving, at the travel listing aggregation computer from the particular data source computer, an indication that the particular listing contains invalid data.

4. The method of claim 3 wherein the travel listing aggregation computer generating the staleness threshold for the particular listing comprises:
receiving, at the travel listing aggregation computer, a plurality of requests for a plurality of different listings from a plurality of user computing devices;
using digitally programmed logic of the travel listing aggregation computer, generating, based on the plurality of requests, a demand value for the particular listing that describes a likely demand for the particular listing;
using digitally programmed logic of the travel listing aggregation computer, generating the staleness threshold for the particular listing based, at least in part, on the demand value, wherein the travel listing aggregation computer increases the staleness threshold when the demand value decreases.

5. The method of claim 3 wherein the travel listing aggregation computer generating the staleness threshold for the particular listing comprises:

using digitally programmed logic of the travel listing aggregation computer, storing look-to-book data indicating, for each data source computer of the one or more data source computers:

a first value describing a number of instances of a user computing device displaying a target listing of the data source computer in which the user computing device completes a transaction with the data source computer for the target listing;

a second value describing a number of instances of a user computing device displaying a target listing of the data source computer in which the user computing device does not complete a transaction with the data source computer for the target listing;

using digitally programmed logic of the travel listing aggregation computer, generating the staleness threshold for the particular listing based, at least in part, on look-to-book data stored for the particular data source computer, wherein the travel listing aggregation computer increases the staleness threshold as a ration between the first value and the second value for the particular data source computer increases.

6. The method of claim 1 wherein determining that the particular listing of the plurality of listings stored in the local data cache contains invalid data comprises:

using digitally programmed logic of the travel listing aggregation computer, determining, for each listing of a plurality of stored listings that includes the particular listing, that the listing stored in the local data cache likely contains invalid data;

using digitally programmed logic of the travel listing aggregation computer, determining, based on one or more data request limits, that the travel listing aggregation computer is unable to send an update request for each listing of the plurality of stored listings;

using digitally programmed logic of the travel listing aggregation computer, selecting the particular listing from the plurality of stored listings;

using digitally programmed logic of the travel listing aggregation computer, sending an update request to the particular data source computer that identifies the particular listing;

receiving, at the travel listing aggregation computer from the particular data source computer, an indication that the particular listing contains invalid data.

7. The method of claim 6 wherein selecting the particular listing from the plurality of stored listings is based on one or more of:

a likelihood that data in the particular listing is no longer valid;

a likelihood that data in each other listing of the plurality of listings is no longer valid;

look-to-book data which indicates, for the particular data source computer:

a first value describing a number of instances of a user computing device displaying a target listing of the particular data source computer in which the user computing device completes a transaction with the particular data source computer for the target listing;

a second value describing a number of instances of a user computing device displaying a target listing of the particular data source computer in which the user computing device does not complete a transaction with the particular data source computer for the target listing;

look-to-book data stored for each other data source computer of the one or more data source computers;

a demand value for the particular listing;

a demand value for each other listing of the plurality of listings;

a related listing value for the particular listing that describes a number of listings associated with the particular listing;

a related listing value for each other listing of the plurality of listings that describes a number of listings associated with each other listing.

8. The method of claim 1 wherein determining that the particular listing of the plurality of listings stored in the local data cache contains invalid data comprises:

using digitally programmed logic of the travel listing aggregation computer, generating a staleness threshold for each listing of the plurality of listings that describes a period of time after which each listing of the plurality of listings is considered stale;

using digitally programmed logic of the travel listing aggregation computer, determining that a staleness threshold for each listing of a subset of listings of the plurality of listings has passed;

using digitally programmed logic of the travel listing aggregation computer, identifying the particular listing as a representative listings for the subset of listings of the plurality of listings;

wherein the subset of listings consists of the particular listing and the one or more related listings;

using digitally programmed logic of the travel listing aggregation computer, sending an update request to the particular data source computer that identifies the particular listing;

receiving, at the travel listing aggregation computer from the particular data source computer, an indication that the particular listing contains invalid data.

9. The method of claim 1 wherein determining that the particular listing of the plurality of listings stored in the local data cache contains invalid data comprises:

using digitally programmed logic of the travel listing aggregation computer, receiving, from an advanced data source computer of the one or more data source computers, change data that identifies listings of the advanced data source computer in which data has been changed;

using digitally programmed logic of the travel listing aggregation computer, identifying the particular listing of the particular data source computer as related to the listings of the advanced data source computer in which data has been changed;

using digitally programmed logic of the travel listing aggregation computer, determining, based on the change data for the listings of the advanced data source computer that the particular listing likely contain data that has changed;

using digitally programmed logic of the travel listing aggregation computer, sending an update request to the particular data source computer that identifies the particular listing;

receiving, at the travel listing aggregation computer from the particular data source computer, an indication that the particular listing contains invalid data.

10. The method of claim 1 wherein identifying one or more related listings that are associated with the particular listing comprises:

identifying an inventory item described by the particular listing;

identifying the one or more related listings received from data source computers other than the particular data source computer as describing the inventory item described by the particular listing.

11. The method of claim 1 wherein the travel listing aggregation computer identifying one or more related listings that are associated with the particular listing comprises:

identifying an inventory item with particular attributes described by the particular listing;

identifying the one or more related listings as describing the inventory item described by the particular listing with varying attributes.

12. The method of claim 1 wherein the travel listing aggregation computer identifying one or more related listings that are associated with the particular listing comprises:

identifying a plurality of associated listings that are associated with the particular listing;

using digitally programmed logic of the travel listing aggregation computer, determining, based on one or more data request limits, that the travel listing aggregation computer is unable to send an update request for each listing of the plurality of associated listings;

using digitally programmed logic of the travel listing aggregation computer, selecting the one or more related listings based, at least in part, on one or more of:

a likelihood that data in the one or more related listing is no longer valid;

a likelihood that data in each other listing of the plurality of associated listings is no longer valid;

look-to-book data which indicates, for each target data source computer of the one or more target data source computers:

a first value describing a number of instances of a user computing device displaying a target listing of the target data source computer in which the user computing device completes a transaction with the target data source computer for the target listing;

a second value describing a number of instances of a user computing device displaying a target listing of the particular data source computer in which the user computing device does not complete a transaction with the particular data source computer for the target listing;

look-to-book data stored for each other data source computer of the one or more data source computers;

a demand value for the one or more related listings;

a demand value for each other listing of the plurality of associated listings.

13. The method of claim 1 further comprising:

using digitally programmed logic of the travel listing aggregation computer, identifying a plurality of stored listings in the local data cache that likely contain invalid data;

using digitally programmed logic of the travel listing aggregation computer, identifying a representative listing of the plurality of stored listings;

using digitally programmed logic of the travel listing aggregation computer, sending an update request to a representative listing data source computer that identifies the representative listing;

receiving, at the travel listing aggregation computer from the representative listing data source computer, an indication that the representative listing stored in the local data cache contains valid data;

using digitally programmed logic of the travel listing aggregation computer, determining, based on the indication that the representative listing stored in the local data cache contains valid data, that other listings of the plurality of stored listings likely contain valid data;

in response to determining that other listings of the plurality of stored listings likely contain valid data, the travel listing aggregation computer waiting to send update requests until the travel listing aggregation computer receives an indication that the data in the plurality of stored listings is no longer valid.

14. A system comprising:

a memory;

one or more processors coupled to the memory configured to:

send a first request to one or more data source computers for a plurality of listings that describe a plurality of travel items;

wherein each travel listing describes a respective travel item;

receive the plurality of listings that describe the plurality of travel items from the one or more data source computers;

store the plurality of listings in a local data cache in the memory;

determine that a particular listing of the plurality of listings stored in the local data cache contains invalid data;

send a second request to a particular data source computer of the one or more data source computers for updated data for the particular listing;

identify one or more related listings that are associated with the particular listing;

send one or more third requests to one or more target data source computers of the one or more data source computers for updated data for the one or more related listings.

15. The system of claim 14 wherein the one or more processors are configured to determine that the particular listing of the plurality of listings stored in the local data cache contains invalid data by:

generating, a staleness threshold for the particular listing that describes a period of time after which the particular listing is considered stale;

determining that the staleness threshold for the particular listing has passed;

sending an update request to the particular data source computer that identifies the particular listing;

receiving an indication that the particular listing contains invalid data.

16. The system of claim 15 wherein the one or more processors are configured to generate the staleness threshold for the particular listing by:

storing look-to-book data indicating, for each data source computer of the one or more data source computers:

a first value describing a number of instances of a user computing device displaying a target listing of the data source computer in which the user computing device completes a transaction with the data source computer for the target listing;

a second value describing a number of instances of a user computing device displaying a target listing of the data source computer in which the user computing device does not complete a transaction with the data source computer for the target listing;
generating the staleness threshold for the particular listing based, at least in part, on look-to-book data stored for the particular data source computer, wherein the one or more processors increase the staleness threshold as a ration between the first value and the second value for the particular data source computer increases.

17. The system of claim 14 wherein the one or more processors are configured to determine that the particular listing of the plurality of listings stored in the local data cache contains invalid data by:
    determining, for each listing of a plurality of stored listings that includes the particular listing, that the listing stored in the local data cache likely contains invalid data;
    determining, based on one or more data request limits, that the one or more processors are unable to send an update request for each listing of the plurality of stored listings;
    selecting the particular listing from the plurality of stored listings;
    sending an update request to the particular data source computer that identifies the particular listing;
    an indication that the particular listing contains invalid data.

18. The system of claim 17 wherein selecting the particular listing from the plurality of stored listings is based on one or more of:
    a likelihood that data in the particular listing is no longer valid;
    a likelihood that data in each other listing of the plurality of listings is no longer valid;
    look-to-book data which indicates, for the particular data source computer:
        a first value describing a number of instances of a user computing device displaying a target listing of the particular data source computer in which the user computing device completes a transaction with the particular data source computer for the target listing;
        a second value describing a number of instances of a user computing device displaying a target listing of the particular data source computer in which the user computing device does not complete a transaction with the particular data source computer for the target listing;
    look-to-book data stored for each other data source computer of the one or more data source computers;
    a demand value for the particular listing;
    a demand value for each other listing of the plurality of listings;
    a related listing value for the particular listing that describes a number of listings associated with the particular listing;
    a related listing value for each other listing of the plurality of listings that describes a number of listings associated with each other listing.

19. The system of claim 14 wherein the one or more processors are configured to determine that the particular listing of the plurality of listings stored in the local data cache contains invalid data by:
    generating a staleness threshold for each listing of the plurality of listings that describes a period of time after which each listing of the plurality of listings is considered stale;
    determining that a staleness threshold for each listing of a subset of listings of the plurality of listings has passed;
    identifying the particular listing as a representative listings for the subset of listings of the plurality of listings;
    wherein the subset of listings consists of the particular listing and the one or more related listings;
    sending an update request to the particular data source computer that identifies the particular listing;
    receiving, from the particular data source computer, an indication that the particular listing contains invalid data.

20. The system of claim 14 wherein the one or more processors are configured to determine that the particular listing of the plurality of listings stored in the local data cache contains invalid data by:
    receiving, from an advanced data source computer of the one or more data source computers, change data that identifies listings of the advanced data source computer in which data has been changed;
    identifying the particular listing of the particular data source computer as related to the listings of the advanced data source computer in which data has been changed;
    determining, based on the change data for the listings of the advanced data source computer that the particular listing likely contain data that has changed;
    sending an update request to the particular data source computer that identifies the particular listing;
    receiving from the particular data source computer an indication that the particular listing contains invalid data.

21. The system of claim 14 wherein the one or more processors are configured to identify one or more related listings that are associated with the particular listing by:
    identifying an inventory item described by the particular listing;
    identifying the one or more related listings received from data source computers other than the particular data source computer as describing the inventory item described by the particular listing.

22. The system of claim 14 wherein the one or more processors are configured to identify one or more related listings that are associated with the particular listing by:
    identifying an inventory item with particular attributes described by the particular listing;
    identifying the one or more related listings as describing the inventory item described by the particular listing with varying attributes.

23. The system of claim 14 wherein the one or more processors are configured to identify one or more related listings that are associated with the particular listing by:
    identifying a plurality of associated listings that are associated with the particular listing;
    determining, based on one or more data request limits, that the one or more processors are unable to send an update request for each listing of the plurality of associated listings;
    selecting the one or more related listings based, at least in part, on one or more of:
        a likelihood that data in the one or more related listing is no longer valid;
        a likelihood that data in each other listing of the plurality of associated listings is no longer valid;
        look-to-book data which indicates, for each target data source computer of the one or more target data source computers:

a first value describing a number of instances of a user computing device displaying a target listing of the target data source computer in which the user computing device completes a transaction with the target data source computer for the target listing;

a second value describing a number of instances of a user computing device displaying a target listing of the particular data source computer in which the user computing device does not complete a transaction with the particular data source computer for the target listing;

look-to-book data stored for each other data source computer of the one or more data source computers;

a demand value for the one or more related listings;

a demand value for each other listing of the plurality of associated listings.

24. The system of claim 14 wherein the one or more processors are further configured to:

identify a plurality of stored listings in the local data cache that likely contain invalid data;

identify a representative listing of the plurality of stored listings;

send an update request to a representative listing data source computer that identifies the representative listing;

receive from the representative listing data source computer, an indication that the representative listing stored in the local data cache contains valid data;

determine, based on the indication that the representative listing stored in the local data cache contains valid data, that other listings of the plurality of stored listings likely contain valid data;

in response to determining that other listings of the plurality of stored listings likely contain valid data, wait to send update requests until the one or more processors receive an indication that the data in the plurality of stored listings is no longer valid.

* * * * *